United States Patent
Akella et al.

(10) Patent No.: US 9,391,813 B2
(45) Date of Patent: Jul. 12, 2016

(54) LONG ECHO DETECTION AND CHANNEL ESTIMATION FOR OFDM SYSTEMS

(75) Inventors: Rama Akella, San Diego, CA (US); Roger Cheng, Hong Kong (HK)

(73) Assignee: MaxLinear, Inc., Carlsbad, CA (US)

( * ) Notice: Subject to any disclaimer, the term of this patent is extended or adjusted under 35 U.S.C. 154(b) by 954 days.

(21) Appl. No.: 12/033,792

(22) Filed: Feb. 19, 2008

(65) Prior Publication Data

US 2008/0198942 A1 Aug. 21, 2008

Related U.S. Application Data

(60) Provisional application No. 60/890,237, filed on Feb. 16, 2007.

(51) Int. Cl.
*H04L 25/02* (2006.01)
*H04L 27/26* (2006.01)
*H04B 3/493* (2015.01)

(52) U.S. Cl.
CPC ............ *H04L 25/0232* (2013.01); *H04B 3/493* (2015.01); *H04L 27/2647* (2013.01); *H04L 27/2665* (2013.01); *H04L 25/022* (2013.01)

(58) Field of Classification Search
CPC ............ H04L 27/2647; H04L 27/2665; H04L 27/2662; H04L 27/2695
USPC .......... 375/260, 343; 370/203, 208, 210, 335, 370/342
See application file for complete search history.

(56) References Cited

U.S. PATENT DOCUMENTS

| | | | |
|---|---|---|---|
| 6,459,744 B1 * | 10/2002 | Helard | H04L 5/0048 375/354 |
| 6,487,253 B1 | 11/2002 | Jones, IV et al. | |
| 6,904,078 B1 | 6/2005 | Abeta et al. | |
| 7,139,320 B1 * | 11/2006 | Singh et al. | 375/260 |
| 7,177,376 B2 | 2/2007 | Atungsiri et al. | |
| 7,466,778 B2 | 12/2008 | Ananth et al. | |
| 7,542,411 B1 * | 6/2009 | Goh | H04L 27/2607 370/208 |
| 7,660,229 B2 | 2/2010 | Papasakellariou et al. | |
| 7,701,841 B2 * | 4/2010 | Kawauchi | H04L 25/0232 370/208 |

(Continued)

OTHER PUBLICATIONS

International Search Report of the International Searching Authority for Application No. PCT/US2008/054317, mailed on May 23, 2008, 1 page.

(Continued)

*Primary Examiner* — Daniel Washburn
*Assistant Examiner* — Eboni Hughes
(74) *Attorney, Agent, or Firm* — Kilpatrick Townsend & Stockton LLP

(57) ABSTRACT

A method and an apparatus are provided in an OFDM receiver for detecting and compensating for long echo. The method comprises a first pilot tone interpolation mechanism and a first window placement to filter a received OFDM symbol, a long echo channel detection coupled with a second pilot tone interpolation mechanism, a pre-echo and post-echo detection wherein the pre-echo condition is associated with a second new window placement, and both pre-echo and post-echo conditions place two time windows around a first peak channel response and a second peak channel response for channel estimation. The long echo is estimated by obtaining power spectra of a subset of subcarriers in one OFDM symbol, performing an inverse Fourier transform on the power spectra and determining the long echo by measuring the time between two peaks in the power profile.

7 Claims, 6 Drawing Sheets

(56) References Cited

U.S. PATENT DOCUMENTS

| | | | |
|---|---|---|---|
| 7,929,645 B2 | 4/2011 | Akella et al. | |
| 8,045,633 B2* | 10/2011 | Baggen | G02B 27/2214 375/260 |
| 2003/0012308 A1* | 1/2003 | Sampath | H04L 25/022 375/340 |
| 2003/0198201 A1 | 10/2003 | Ylitalo et al. | |
| 2005/0213680 A1* | 9/2005 | Atungsiri | H04L 25/0216 375/260 |
| 2006/0222099 A1* | 10/2006 | Varadarajan | H04L 25/0216 375/260 |
| 2006/0274641 A1 | 12/2006 | Grieco et al. | |
| 2006/0285600 A1* | 12/2006 | Duncan | H04L 25/022 375/260 |
| 2008/0192843 A1* | 8/2008 | Tenny | H04L 25/0232 375/260 |
| 2010/0142659 A1* | 6/2010 | Gold-Gavriely | H04L 27/2688 375/343 |

OTHER PUBLICATIONS

Written Opinion of the International Searching Authority for Application No. PCT/US2008/054317, mailed on May 23, 2008, 5 pages.
International Search Report and Written Opinion for Patent Application No. PCT/US2007/081136, mailed on Mar. 17, 2008, 5 pages.
International Preliminary Report on Patentability for Application No. PCT/US2007/081136, mailed on Apr. 15, 2009, 5 pages.
*Ex parte Quayle* for U.S. Appl. No. 11/870,726, mailed on Jun. 7, 2010, 7 pages.
Notice of Allowance for U.S. Appl. No. 11/870,726, mailed on Dec. 17, 2010, 4 pages.
International Preliminary Report on Patentability for International Application No. PCT/US2008/054317, mailed on Aug. 19, 2009, 6 pages.

\* cited by examiner

Pilot interpolation approach 1

Pilot interpolation approach 3

Pilot interpolation for 8k mode

LONG ECHO DETECTION AND CHANNEL ESTIMATION FOR OFDM SYSTEMS

CROSS-REFERENCES TO RELATED APPLICATIONS

The present application claims benefit under 35 USC 119 (e) of U.S. provisional application No. 60/890,237, filed Feb. 16, 2007, entitled "Long Echo Detection And Channel Estimation For OFDM Systems", the content of which is incorporated herein by reference in its entirety.

The present application is related to U.S. patent application Ser. No. 11/870,726, filed Oct. 11, 2007, entitled "Method and apparatus for channel estimation in OFDM receivers", now U.S. Pat. No. 7,929,645, issued on Apr. 19, 2011, the contents of which is hereby incorporated by reference in its entirety.

BACKGROUND OF THE INVENTION

Orthogonal frequency division multiplexing (OFDM) has gained considerable interest in recent years. In an OFDM system, data are modulated on frequency domain subcarriers. The modulated subcarriers are degraded when passing through a multipath channel. A channel is defined as the medium between a transmitter and a receiver, and multipath results in radio signals reaching a receiver by two or more paths. The time delay caused by the multipath effect is called echo, and a long echo is a received signal having a long time delay. Due to the multipath effect, subcarriers will suffer degradation which must be corrected at the receiver.

For coherent detection, these subcarrier frequency responses must be estimated through the use of pilot tones. For this reason, pilot tones are inserted in OFDM symbols to enable the interpolation of the channel response. Pilot tones are usually distributed in both frequency and time dimensions to enable the estimation of time-varying channel response.

FIG. 1 shows a sequence of OFDM symbols, wherein data and pilot tones are modulated into K subcarriers. In the example shown, K is 1704 and 6816 in a 2K-mode and an 8K-mode DVB-T system, respectively. The remaining subcarriers are the empty subcarriers at both ends of the frequency band. Solid black circles represent pilot tones while white circles represent data subcarriers transmitted from a DVB-T transmitter station. Guard intervals preceding each OFDM symbol are not shown.

In DVB-T receivers, the channel estimation is carried out through pilot signal estimation, and the accuracy of the interpolation depends on the number of pilots present in OFDM symbols.

BRIEF SUMMARY OF THE INVENTION

In accordance with the present invention, a long echo is detected to enable estimation of a channel. The method comprises receiving a sequence of OFDM symbols, each OFDM symbol including data subcarriers and pilot tones. The sequence of OFDM symbols is obtained after frequency down-conversion, I/Q demodulation, analog-to-digital conversion and an FFT operation. Data at the FFT output are stored in a memory module for further processing. TPS signals and pilot tones are extracted. A first pilot tone interpolation is performed to increase the density from $1/12$ to $1/3$. The enhanced pilot tones are converted to the time domain where a window is applied to remove images of channel profiles and contain the maximum energy. A long echo detector forms squares of absolute values of a subset of subcarriers (for example just one subcarrier) to obtain a power spectrum density (PSD), paddles the remaining symbol period with zero-values, transforms the zero-padded PSD to the time domain using an iFFT operation and obtains a set of N discrete time values. The N discrete time values are compared with a threshold which is calculated from a subset of the N values. Discrete time domain peaks are identified and the distance between them is measured. If a time difference between discrete time domain peaks exceeds a predetermined delay time, the channel is considered to have a long delay and is called a long echo channel and the long echo location is identified. Depending on the value of the obtained delay difference, further processing steps will be selected. For a short-echo channel, a second pilot interpolation scheme is used for the final channel estimation. For a long-echo channel, a third pilot interpolation scheme is used together with a pre/post echo detector which determines the nature of the long echo. For determining the nature of the long echo channel, the interpolated pilot tones according to the third interpolation scheme is transformed to the time domain to obtain a set of Nh amplitude values. The pre/post echo detector searches for an amplitude peak at the proximity of the long echo location. The amplitude peak is compared with an average value obtained from a subset of the Nh values. If the amplitude peak is greater than the average value, the long echo channel is a post-echo channel, otherwise, the long echo channel is a pre-echo channel. In the case of the pre-echo channel, a new time window is placed around the pre-echo location to capture the signal energy as much as possible without the components of inter-symbol interference. In both the pre-echo and post-echo channel cases, two individual windows are placed at the center of the amplitude peaks with location index zero and $\Delta L$ to eliminate noisy signal components. The time-window filtered responses are then transformed in the frequency domain after channel estimation.

In one embodiment of the present invention, a long channel detector in an OFDM receiver system detects a delay spread. Used subcarriers in one OFDM symbol are converted to a power amplitude. The rest of the OFDM symbol is zero-padded and transformed to the time domain, where the long echo channel detector measures the time difference between two peaks. If the time difference is greater than a predetermined time value, a long echo is present in the channel, and the nature of the long echo channel will be determined by a pre-echo-post echo detector. An iFFT operation transforms the interpolated pilots to a set of impulse responses in the time-domain, which are then used for pre/post echo identification. The long echo channel is a pre-echo channel if the peak tap in an impulse response is equal to or less than an amplitude threshold, and a new window is placed around the pre-echo location to obtain maximum energy. Two windows are placed around the two peak values having the time difference greater than the predetermined time value. The accurate channel frequency response is obtained by performing an FFT operation on these time-windowed impulse responses.

The features, objects, and advantages of embodiments of the present invention will become more apparent from the detailed description set forth below when taken in conjunction with the drawings.

DETAILED DESCRIPTION OF THE INVENTION

In an OFDM receiver, channel estimation is performed in the frequency domain in the signal output from an FFT (Fast Fourier Transform) operation. Initial window placement provides desired samples for FFT which are approximately aligned to the symbols being transmitted. The symbol timing is subsequently estimated more accurately in a channel estimation block. Channel estimation can be performed in the frequency domain by using pilot tones distributed in a periodic fashion throughout the channel; these are transformed by an IFFT (inverse FFT) to yield the time-domain channel impulse response. Once this impulse response is calculated, a more precise window placement is possible so that timing errors introduced by intersymbol interference (ISI) can be removed.

In DVB-T systems, one in every twelve subcarriers is a pilot tone; the position of the pilot tones changes with each symbol as pilot tones are cycled through each subcarrier. The effective density of pilot tones can be increased by using nearby pilot tones on either side of a pilotless subcarrier to interpolate the channel at the pilotless subcarrier (interpolation within one symbol). Alternatively, pilot values from previous and future symbols can be used to interpolate the channel value for the current symbol at any given subcarrier (interpolation across multiple symbols). The interpolation of pilot tones across symbols is referred to as time-domain interpolation hereinafter since the interpolation is performed in the time dimension.

Figure 1:
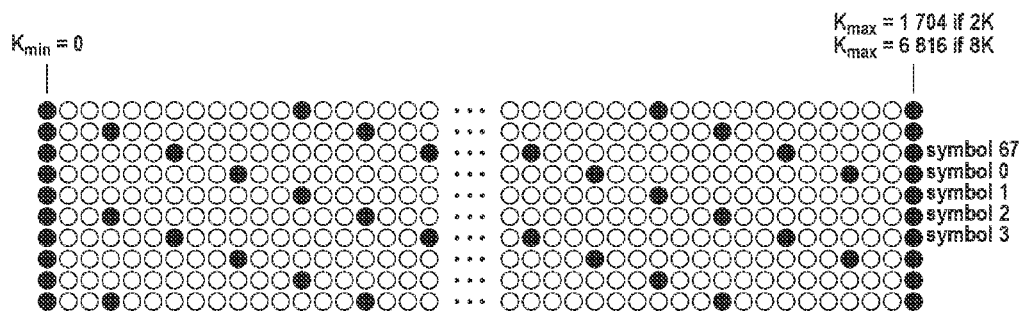
FIG. 1 shows an ODFM sequence with pilot tones periodically scattered within the OFDM symbols, as known in the DVB-T specification.
Figure 2A:
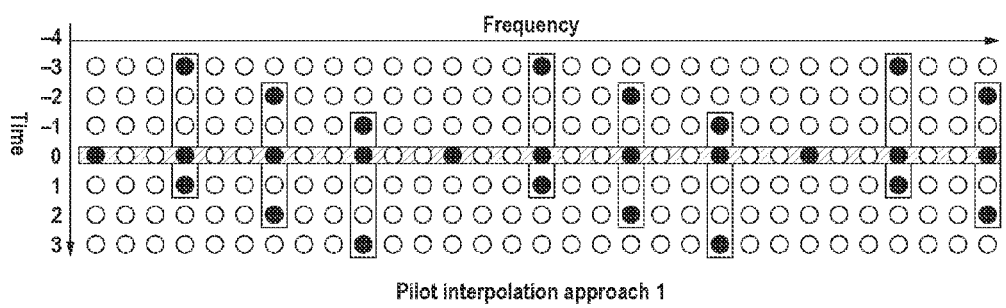
FIGS. 2A-2C show three different pilot tone interpolation schemes.
Figure 2B:
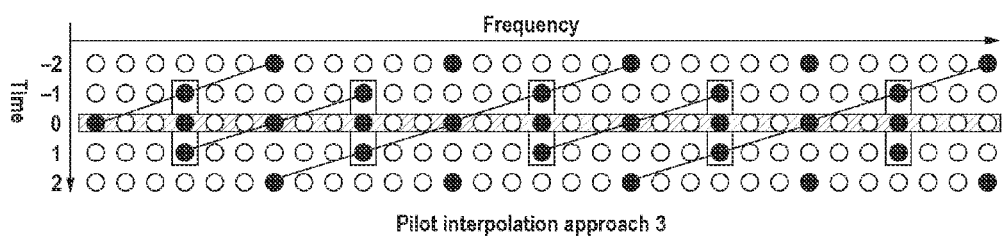
Figure 2C:
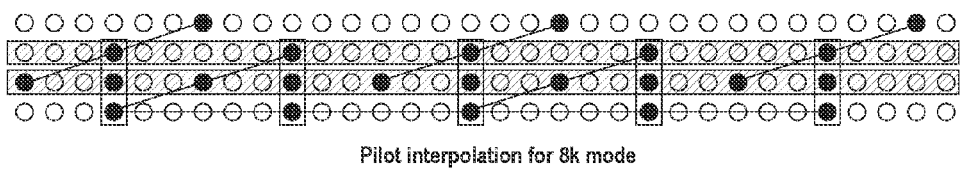

FIGS. 2A-2C show three different across-symbol interpolation approaches, as described in commonly assigned U.S. application Ser. No. 11/870,726, now U.S. Pat. No. 7,929,645.

Each technique uses only a few pilot tones, resulting in simplicity of calculation, efficient implementation, and consumption of less memory space. In the following: (i) symbol $\Lambda$ is used to indicate an estimated pilot symbol, (ii) black circles represent pilot tones, (iii) white circles represent data tones (iv) cross-hatched circles represent estimated symbols, (v) 1 is the index of the symbol shown along the y-axis, (vi) and i is the pilot position in the current symbol shown along the x-axis.

In accordance with one embodiment of the present invention and as shown in FIG. 2A, previous and future pilots in time domain are used to do linear interpolation, in accordance with the following expressions:

$$\hat{P}_{l,i+3}=C_1 P_{l-3,i+3}+C_2 P_{l+1,i+3} \quad (a1)$$

$$\hat{P}_{l,i+6}=C_3 P_{l-2,i+6}+C_4 P_{l+2,i+6} \quad (a2)$$

$$\hat{P}_{l,i+9}=C_5 P_{l-1,i+9}+C_6 P_{l+3,i+9} \quad (a3)$$

$i=3*(l \bmod 4)+12n$, for $n$ integer, $n \geq 0$.

In other words, pilot position i+3 of a current symbol, i.e. $\hat{P}_{l,i+3}$, is estimated as being equal to a weighted average of the similar pilot positions of the succeeding symbol (the symbol whose index is one higher than the index of the current symbol), i.e. $\hat{P}_{l+1,i+3}$, and the third preceding symbol (the symbol whose index is one less than the index of the current symbol by 3), i.e. $P_{l-3,i+3}$. For example, pilot $(\hat{P}_{l,i+3})$ is estimated by interpolating pilot symbols $(P_{l+1,i+3})$ and pilot symbol $(P_{l-3,i+3})$ in accordance with expression (a1) shown above.

Pilot position i+6 of a current symbol, i.e. $\hat{P}_{l,i+6}$, is defined as being equal to a weighted average of the similar pilot positions of the second succeeding symbol (the symbol whose index is two higher than the index of the current symbol), i.e. $P_{l+2,i+6}$, and the second preceding symbol (the symbol whose index is two less than the index of the current symbol), i.e. $P_{l-2,i+6}$. For example, pilot $(\hat{P}_{l,i+6})$ is estimated by interpolating pilot symbols $(P_{l+2,i+6})$ and pilot symbol $(P_{l-2,i+6})$ in accordance with expression (a2) shown above.

Pilot position i+9 of a current symbol, i.e. $\hat{P}_{l,i+9}$, is defined as being equal to a weighted average of the similar pilot positions of the third succeeding symbol, i.e. $P_{l+3,i+9}$, and the preceding symbol, i.e. $P_{l-1,i+9}$. For example, pilot $(\hat{P}_{l,i+9})$ is estimated by interpolating pilot symbols $(P_{l+3,i+9})$ and pilot symbol $(P_{l-1,i+9})$ in accordance with expression (a3) shown above. If the interpolated pilot position is also a continuous pilot position, the result of the interpolation is ignored and the transmitted continuous pilot is used as received.

In one exemplary embodiment, coefficients $C_1, C_2, C_3, C_4, C_5$ and $C_6$ have the values shown below:

$$\hat{P}_{l,i+3}=0.25 P_{l-3,i+3}+0.75 P_{l+1,i+3}$$

$$\hat{P}_{l,i+6}=0.5 P_{l-2,i+6}+0.5 P_{l+2,i+6}$$

$$\hat{P}_{l,i+9}=0.75 P_{l-1,i+9}+0.25 P_{l+3,i+9}$$

$i=3*(l \bmod 4)+12n$, for $n$ integer, $n \geq 0$.

In accordance with another embodiment of the present invention and as shown in FIG. 2B, first diagonal pilot positions are used to obtain the pilots at the center between each two original pilots in accordance with the expression (a4) shown below:

$$\hat{P}_{l+1,i+9}=C_7 P_{l+2,i+6}+C_8 P_{l,i+12} \quad (a4)$$

Subsequently in time domain, using two pilots, linear interpolation is performed in accordance with the expressions shown below:

$$\hat{P}_{l,i+3}=C_1 \hat{P}_{l-1,i+3}+C_2 P_{l+1,i+3} \quad (a5)$$

$$\hat{P}_{l,i+6}=C_3 \hat{P}_{l-1,i+9}+C_4 P_{l+1,i+3} \quad (a6)$$

$$\hat{P}_{l,i+9}=C_5 \hat{P}_{l-1,i+9}+C_6 P_{l+1,i+9} \quad (a7)$$

$i=3*(l \bmod 4)+12n$, for $n$ integer, $n \geq 0$.

Pilot position i+3 of a current symbol, i.e. $\hat{P}_{l,i+3}$, is estimated as being equal to a weighted average of the similar pilot positions of an estimate of the preceding symbol, i.e., $P_{l-1,i+3}$, and a succeeding symbol, i.e. $P_{l+1,i+3}$. For example, pilot $(\hat{P}_{l,i+3})$ is estimated by interpolating pilot symbol $(P_{l+1,i+3})$ and estimated pilot symbol $(P_{l-1,i+3})$ in accordance with expression (a5) shown above.

Pilot position i+6 of a current symbol, i.e. $\hat{P}_{l,i+6}$, is estimated as being equal to a weighted average of pilot position i+9 of an estimate of the preceding symbol $\hat{P}_{l-1,i+9}$ and pilot position i+3 of a succeeding symbol, i.e. $P_{l+1,i+3}$. For example, pilot $(\hat{P}_{l,i+6})$ is estimated by interpolating estimated pilot symbol ($P_{l-1,i+3}$) and pilot symbol ($P_{l+1,i+3}$) in accordance with expression (a6) above.

Pilot position i+9 of a current symbol, i.e. $\hat{P}_{l,i+9}$, is estimated as being equal to a weighted average of the similar pilot positions of an estimate of the preceding symbol i.e. $\hat{P}_{l-1,i+9}$, and the succeeding symbol, i.e. $\hat{P}_{l,i+9}$. For example, pilot ($\hat{P}_{l,i+9}$) is estimated by interpolating estimated pilot symbols ($\hat{P}_{l-1,i+9}$) and pilot symbol ($\hat{P}_{l,i+9}$) in accordance with expression (a7) above.

Initially, the estimated channel for a preceding symbol is not available but may be obtained using a number of techniques. For example, in one technique, the receiver waits until it receives and saves symbols for each of the pilots (l−1,i), (l−1,i+3), (l−1,i+6) and (l−1,i+9) locations. In other words, by knowing the estimated channel for the preceding (l−1) symbol, the present symbol (l), and two succeeding (future) symbols (l+1) and (l+1), all interpolations can be performed. Since, in accordance with the present invention, only the indices associated with a present symbol and two succeeding symbols are stored, substantially smaller amount of memory location is required to perform the interpolations. Following the initialization, interpolation is performed to obtain the pilots for all bins/subcarriers, in accordance with equations (a4)-(a7).

In some embodiment, coefficients $C_1$-$C_8$ have values varying between 0.25 and 0.75. In one specific embodiment, each of coefficients $C_1$-$C_8$ has a value of 0.5.

In the pilot interpolation techniques that are applicable to 2k and 4k modes, a minimum of two future symbols is used. For 8k mode, in accordance with another embodiment of the present invention, only one future symbol is used, thereby saving additional memory space.

The following define the interpolation expressions in accordance with another embodiment of the present invention and as shown in FIG. 2C:

$$\hat{P}_{l,i+3} = C_1\hat{P}_{l-1,i+3} + C_2 P_{l+1,i+3} \quad \text{(a8)}$$

$$\hat{P}_{l,i+6} = C_3\hat{P}_{l-1,i+9} + C_4 P_{l+1,i+3} \quad \text{(a9)}$$

$$\hat{P}_{l,i+9} = C_5\hat{P}_{l-1,i+9} + C_6 P_{l+1,i+9} \quad \text{(a10)}$$

Where $$\hat{P}_{l+1,i+9} = C_7 P_{l+1,i+3} + C_8 P_{l+1,i+15} \quad \text{(a11)}$$

$$i = 3*(l \bmod 4) + 12n, \text{ for } n \text{ integer}, n \geq 0. \quad \text{(a12)}$$

Pilot position i+3 of a current symbol, i.e. $\hat{P}_{l,i+3}$, is estimated as being equal to a weighted average of the similar pilot positions of an estimate of a preceding symbol, i.e., $P_{l-1,i+3}$, and a succeeding symbol, i.e., $P_{l-1,i+3}$. For example, pilot ($\hat{P}_{l,i+3}$) is estimated by interpolating an estimate of preceding pilot symbol ($P_{l-1,i+3}$) and succeeding pilot symbol ($P_{l+1,i+3}$) in accordance with expression (a8) above.

Pilot position i+6 of a current symbol, i.e. $\hat{P}_{l,i+6}$, is estimated as being equal to a weighted average of pilot position i+9 of an estimate of the preceding symbol, i.e., $\hat{P}_{l-1,i+9}$, and pilot position i+3 of the succeeding symbol, i.e. $P_{l+1,i+3}$. For example, pilot ($\hat{P}_{l,i+6}$) is estimated by interpolating pilot symbol ($\hat{P}_{l-1,i+9}$) and pilot symbol ($P_{l+1,i+3}$) in accordance with expression (a9) shown above.

Pilot position i+9 of a current symbol, i.e. $\hat{P}_{l,i+9}$, is estimated as being equal to a weighted average of the similar pilot positions of an estimate of a preceding symbol, i.e. $\hat{P}_{l-1,i+9}$, and an estimate of the succeeding symbol, i.e. $\hat{P}_{l+1,i+9}$. For example, pilot ($\hat{P}_{l,i+9}$) is estimated by interpolating pilot symbols ($\hat{P}_{l-1,i+9}$) and pilot symbol ($\hat{P}_{l+1,i+9}$) in accordance with expression (a10) above. As seen from expression (a11), $\hat{P}_{l-1,i+9}$ is a weighted average of $P_{l+1,i+3}$ and $P_{l+1,i+15}$. In some embodiments, coefficients $C_1$-$C_8$ are equal to 0.5.

In some other embodiments, coefficients $C_1$-$C_8$ have values varying between 0.25 and 0.75. In one specific embodiment, each of coefficients $C_1$-$C_8$ has a value of 0.5.

If (l mod 4)=1, a pilot position at the end of the symbol is interpolated as:

$$\hat{P}_{l,6813} = 0.667\hat{P}_{l,6816} + 0.333\hat{P}_{l,6807}$$

If (l mod 4)=3, a pilot position at the start of the symbol is interpolated as:

$$\hat{P}_{l,3} = 0.667\hat{P}_{l,0} + 0.333\hat{P}_{l,9}$$

Initially, the estimated channel for a preceding symbol is not available but may be obtained using a number of different techniques. For example, in one technique, the receiver waits until it receives and saves four symbols for each of the pilots (l−1,i), (l−1,i+3), (l−1,i+6) and (l−1,i+9) locations. Once, the initialization is carried out, the above interpolations, as shown in equations (a8)-(a12), are performed to estimate the channel.

The channel in most transmission systems varies with time. In an OFDM-based transmission system, channel will also vary between OFDM symbols, between pilot tones and between the data subcarriers.

In certain specifications such as the DVB-T, the OFDM demodulator must provide the ability to deal with channels which exhibit long echo (long multipath delay). The specified echo delay (worst case delay spread) may be as long as for example 90% of the length of the guard interval. Such a long echo exceeds the capability of frequency-domain interpolation channel estimation algorithms due to insufficient density of the pilot tones compared with the rapid variation of the channel with respect to frequency caused by the long echo. The result is that the frequency-domain interpolation will cause significant distortion in the estimated channel. In order to circumvent this problem, the system must detect whether a long echo is present and then treat it accordingly.

The present invention provides a method and apparatus for estimating echo in a transmission environment which causes channel impulse responses to be longer than a certain length. Long channel impulse responses require a precise window placement because an inclusion of a fraction of the guard interval (cyclic prefix) in the window will degrade the effectiveness of pilot-based channel estimation by introducing phase shifts among the pilot tones.

Figure 3:
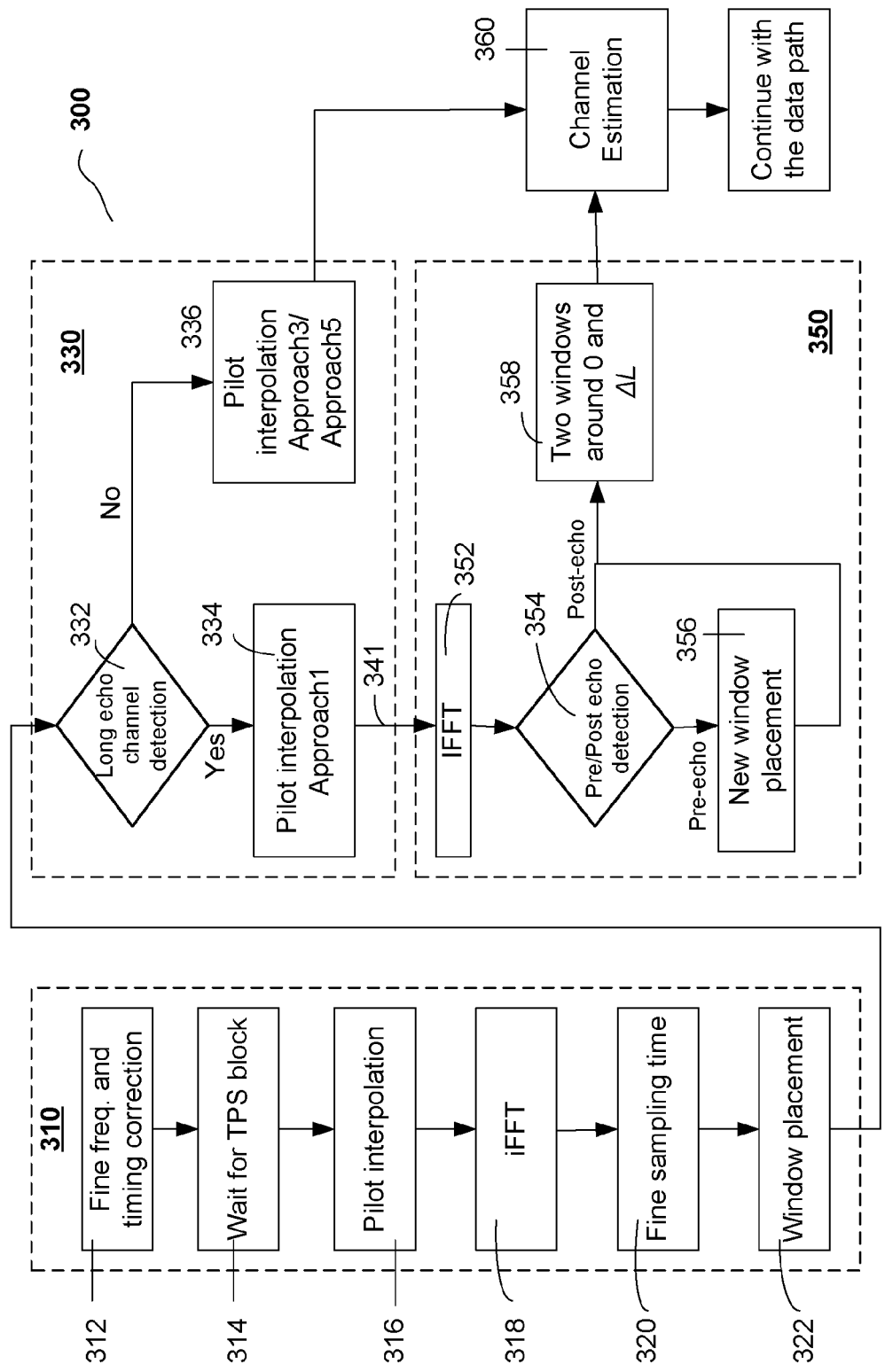
FIG. 3 is a flowchart for performing long echo detection and channel response estimation in accordance with one embodiment of the present invention.

FIG. 3 is a flowchart of steps carried out to estimate echo, in accordance with one embodiment of the present invention. Flowchart 300 is shown as including first, second and third flowcharts 310, 330 and 350, respectively. Flowchart 310 is used for making coarse and fine automatic frequency control corrections, achieving frequency synchronization, and placing a window at the OFDM symbol boundary without the inclusion of a portion of the guard interval (cyclic prefix). Flowchart 330 is used for the long echo channel detection. Flowchart 350 is used for deciding whether the detected long echo is a pre-echo or a post echo. The present invention estimates the channel multiple times in the time domain to filter out noise and achieve accurate channel estimation.

Referring to FIG. 3, at step 312 fine frequency and timing correction is made and frequency synchronization is achieved. In step 314, a wait of up to 1 frame is made for the start of a transmission parameter signaling (TPS) block, and a wait of another frame is made until the complete TPS block is received. There is a wait for one or more additional frames, if necessary, until a TPS block is received without errors.

In step 316 a suitable interpolation scheme is applied to the received scattered pilot tones to obtain in-between values of the channel response. Any interpolation scheme, such as the ones described in U.S. application Ser. No. 11/870,726 may be used.

In step 318 the interpolated values of pilot tones are transformed to the time-domain using an IFFT operation. In step 320 the sampling time for symbol timing synchronization is adjusted.

In step 322 a window is placed at the impulse response that is free of any aliasing components. The window can have any shape, but preferably a rectangular shape if channel impulse taps (taps and samples are used alternatively hereinafter to represent time discrete values) are equally distributed over the window with the same energy.

As shown in flowchart 330, if a long echo channel is detected in step 332, a pilot interpolation technique 334 as shown in FIG. 2a is used. If a long echo channel is not detected in step 332, a pilot interpolation technique 336, such as that shown in FIGS. 2b and 2c are used.

Step 332 can be summarized as follows:
1. Forming squares of received subcarriers in one symbol period;
2. Performing an IFFT on the squared values to convert them to time-domain samples and to obtain a correlation profile;
   i. measuring a time difference ΔL between two peaks in the correlation profile. If the time difference ΔL exceeds a predetermined delay value, perform pilot interpolation of step 334. If the time difference ΔL is equal to or less than the predetermined echo value, perform pilot interpolation of step 336;
   ii. Determine the location of the long (pre/post) echo signal and use that to set windowing;
3. Perform an IFFT of the time-domain interpolated pilot tones to obtain the amplitude and phase of the channel impulse response;
4. Use the windowing information obtained in step 3 to filter out the time aliasing, and perform an FFT to obtain the accurate frequency-domain channel estimate 360.

Third flowchart 350 includes, in part, step 352 which transforms the interpolated pilot tones 341 to the time domain, and step 354 which determines if the long echo is a pre-echo or post-echo channel. The long echo channel is considered a post-echo channel if the channel impulse response is greater than a predetermined amplitude level, and a pre-echo channel if the channel impulse response is less than or equal to the predetermined amplitude level.

If the long echo channel is detected as being a post-echo channel, at step 358 two time-domain windows are centered around zero and ΔL. The width of these two time windows may be determined empirically. If the long echo channel is detected as a pre-echo channel, at step 356 a new time window is placed around the small echo path around zero and the large echo path around ΔL.

At step 360 an FFT is performed on the channel impulse response that is filtered by the two time windows placed at step 358 to obtain the accurate frequency-domain channel estimate.

Figure 4:
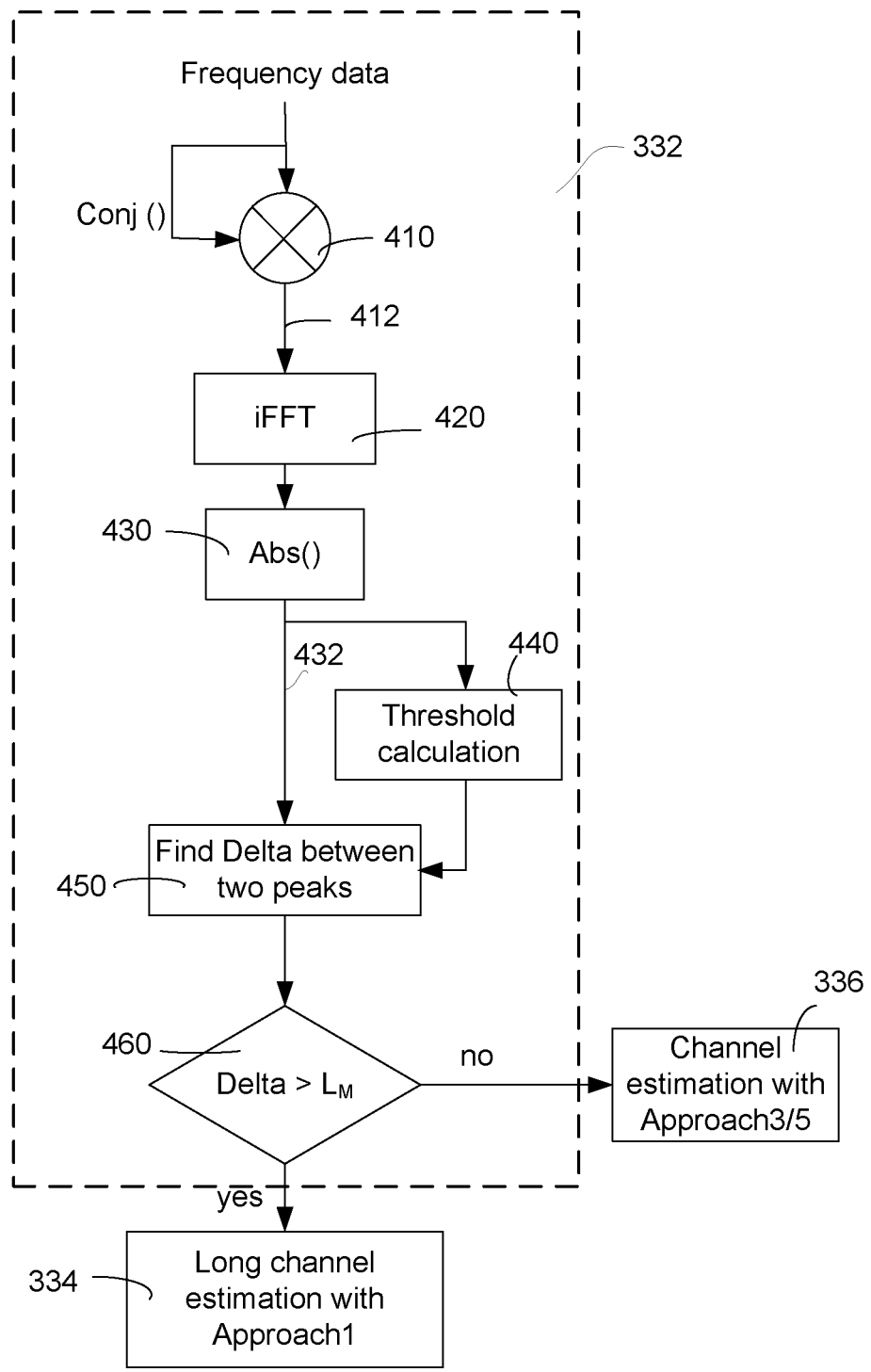
FIG. 4 is a flowchart for performing long echo detection in accordance with one embodiment of the present invention.

Referring to FIG. 4, flowchart 330 shows step 332 in more detail. Step 332 is shown as including steps 410, 420, 430, 440, 450 and 460, described further below. At step 410 the square of frequency data is formed by multiplying the complex values with their conjugate complex values. At step 420 the squared amplitudes 412 are transformed to the time domain values. At step 430 absolute values 432 of the time-domain values are obtained. Step 440 computes a power threshold value by averaging a subset of the absolute values 432 generated in step 430. Step 450 locates two peak values in the absolute values 432 and determines the time difference "Delta" between them. If Delta is greater than a predetermined value $L_M$, step 336 is performed, step 334 is performed if Delta is not greater than the value $L_M$.

Figure 5:
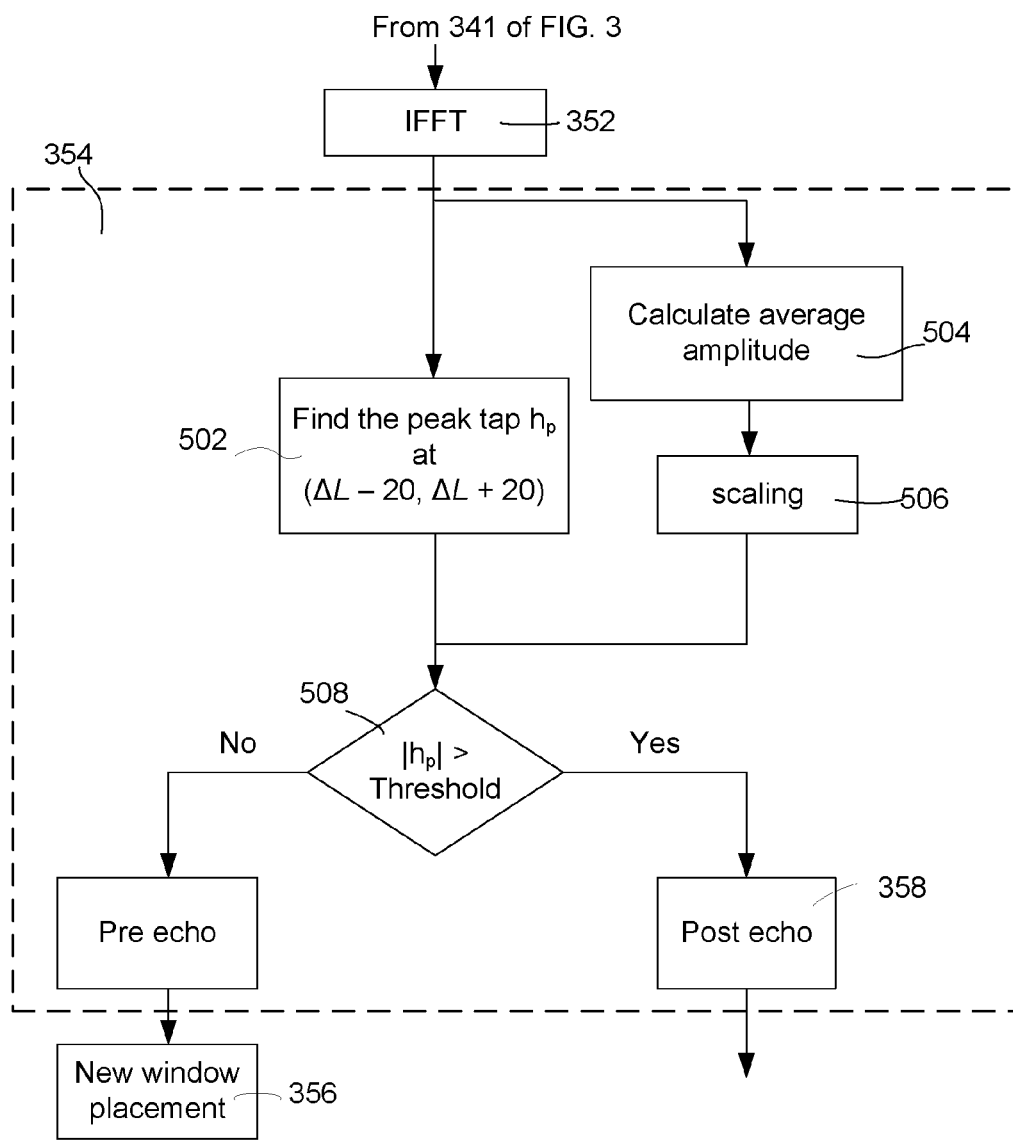
FIG. 5 is a flowchart for performing pre/post echo detection in accordance with one example of the present invention.

Flowchart 350 is shown in more detail in FIG. 5. Referring to FIG. 5, the interpolated pilot tones are transformed to the time domain values at step 352. Step 354 is shown as including steps 502, 504, 506, and 508, described further below. At step 504, a subset of the time domain values obtained in step 352 are used to calculate an average amplitude value. At step 506, the average amplitude value is multiplied by a scaling factor to obtain an amplitude threshold $Thd_h$. The multiplication can be performed for example by a simple left-shift operation. In one embodiment of the present invention, the scaling factor of 8 is obtained by left-shifting the average amplitude value by 3 bits. At step 502, the peak value $h_{pk}$ is searched around the ΔL location, which has been obtained at step 450 (FIG. 4). In one embodiment of the invention, the peak amplitude is searched within the range of (ΔL-20, ΔL+20) for a total of 40 amplitude values. In another embodiment, the peak amplitude is located at ΔL. At step 508, the peak amplitude value $h_{pk}$ is compared with the amplitude threshold $Thd_h$. If the peak amplitude value is greater than $Thd_h$, the long echo channel is a post-echo channel, two windows are applied to the two peaks (found at step 450) in step 358. The long echo channel is a pre-echo channel if the peak amplitude is equal to or less than $Thd_h$, at step 356 a new second window is applied at the pre-echo location and a third window is applied to the other peak positioned at a distance ΔL from the pre-echo location.

The following sections provide a detailed description of FIG. 4. At step 410 the forward FFT provides the frequency domain received signal, $r_0, \ldots r_{N-1}$, where N is the number of subcarriers in the OFDM channel. The squared amplitude of the signal 412 is padded with zero values and passed through the IFFT 420, yielding the power of the time-domain impulse response with which long echo can be detected.

The received frequency domain signal can be expressed as $$r_k = H_k S_k + n_k, \quad (1)$$

where $r_k$ is the received frequency domain subcarrier k, $H_k$ is the channel frequency response at the subcarrier k, and $n_k$ is a complex Gaussian noise.

The squared magnitude is $$\|r_k\|^2 = \|H_k\|^2 \|s_k\|^2 + \tilde{n}_k = \|H_k\|^2 + \hat{\tilde{n}}_k. \quad (2)$$

Because $E\|s_k\|^2 = 1$, and depending on the modulation order, the $\|s_k\|^2$ can be written as $$\|s_k\|^2 = 1 + \hat{n}_k \quad (3)$$

Then, $$\|r_k\|^2 = \|H_k\|^2 + \hat{\tilde{n}}_k, \quad (4)$$

where $\|r_k\|^2$ is the squared magnitude of the channel frequency response at frequency $f_k$ plus noise, and where $\hat{\tilde{n}}_k$ capture all the non-ideal effects as an equivalent "noise" term.

The frequency domain channel can be written as $$H_k = \sum_{l=0}^{\Delta l} \gamma_l \exp\left(j \frac{2\pi k l}{N_{FFT}}\right), \quad (5)$$

where $\gamma_l$ is the l-th channel tap with delay l, Δl is the path with the largest delay from the first arriving path. Severe long echo cases typically consist of only two paths (a main path and an echo path) since the likelihood of three long echoes is very low.

Having estimated $\|H_k\|^2$, the IFFT 420 is used to obtain the magnitude of the time-domain response. This is possible because $$\|H_k\|^2 = \sum_{l,l'} \gamma_l \gamma_{l'} \exp\left(j\frac{2\pi k(l-l')}{N_{FFT}}\right), \quad (6)$$

After taking the IFFT of (6), the following is obtained:

$$R_k = \sum_{l-l'=k} \gamma_l \gamma_{l'} + \hat{\tilde{n}}'_k, k \leq \Delta l, \quad (7)$$

which is the correlation of the time domain responses plus noise, and $\Delta l$ is the delay of the last arriving path.

Figure 6:
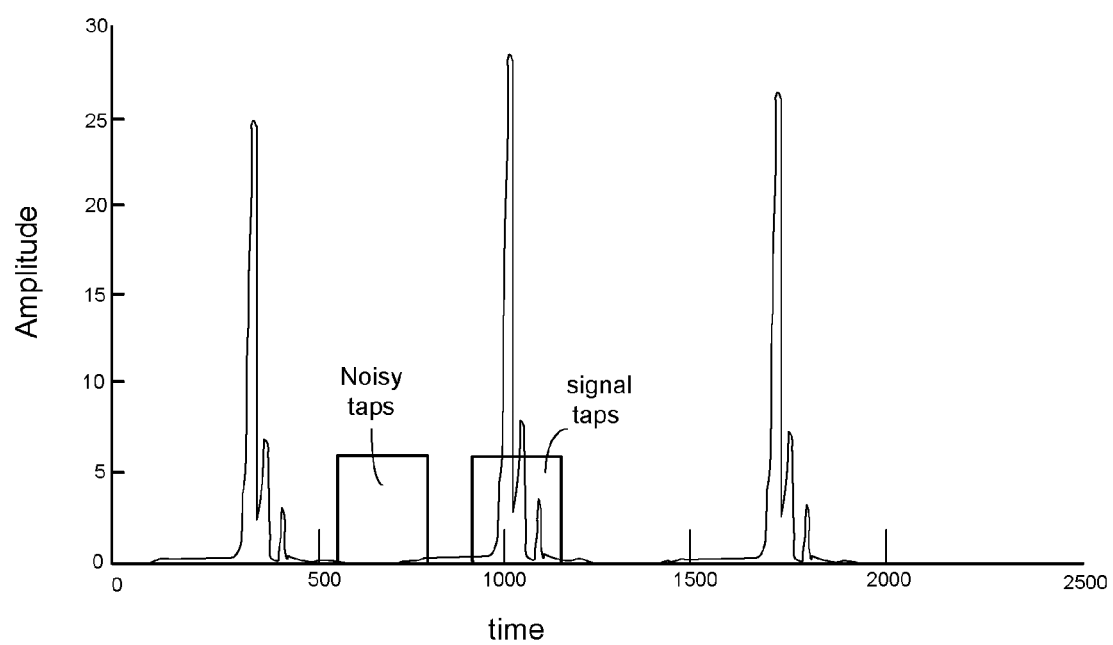
FIG. 6 shows a time-domain windowing operation in accordance with one embodiment of the present invention.

At step 440 the threshold is calculated by first finding the average power in the channel which is estimated by averaging over a subset of subcarriers, e.g., 256, as shown in the example below.

$$P_R = \frac{1}{256} \sum_{k=Ls}^{Ls+255} R_k, \quad (8)$$

where the summation (Ls) to (Ls+255) represents a region free of valid signal components if $P_R$ is the noise power. FIG. 6 shows the result of pilot tone interpolation with density ⅓ in the time domain for one example of the present invention.

At step 450 an algorithm determines the peak taps of $R_k$ and calculate a maximum delay $\Delta l$ between the peaks. The maximum delay $\Delta l$ is then compared against a predetermined value $L_M$, where $L_M$ is some empirically-determined delay threshold. If $\Delta l > L_M$, a long echo channel is obtained,. If $\Delta l > N_{FFT}/6$, the long echo will cause folding back in the time domain response due to ⅓ pilot density.

At step 460, once a long echo is detected, the receiver must then determine if the long echo is pre-echo or post-echo. New FFT window placement is necessary since the initial acquisition is not accurate. At step 334 the receiver applies an interpolation scheme shown in FIG. 2a and described in U.S. application Ser. No. 11/870,726 to obtain an effective pilot density of N/3, i.e., one pilot tone in every 3 subcarrier positions.

Referring to FIG. 5, at step 352 an IFFT is performed to obtain the time domain channel taps. These taps contain channel delay profile coming from the long echo. However, since the system has calculated the position of the long echo, time-domain windowing can be effectively applied around this delay components.

To determine the length of the channel impulse response, it is necessary to find the last tap that exceeds a certain threshold. The first step is to find the peak position of the channel tap by searching all the channel taps within the window ($-N_{FFT}/6$, $N_{FFT}/6$) to find the position of the peak, $L_p$. By adjusting the window position, the new time domain channel peak tap will appear at the zero index.

At step 504 an average amplitude is obtained for example by averaging the tap magnitudes within a range centered around the peak $L_p$ position.

$$P_h = \frac{1}{N} \sum_{k=L_p+51}^{L_p+306} |h_k|, \quad (9)$$

At step 506 a threshold for peak detection is obtained for example multiplying the average amplitude by a scaling factor:

$$Thd_h = \beta * P_h \quad (10)$$

where $h_k$ is the k-th channel tap, N is the number of taps to be averaged over, $\beta_h$ is an empirically determined factor and $L_p$ is some empirically determined averaging window start point. Only values above $Thd_k$ will be taken into consideration and values below $Thd_k$ will be disregarded.

If the echo near $\Delta l$ exceeds a certain threshold, the echo is classified as post echo; otherwise the echo is classified as pre-echo.

For the post echo, no new window is placed. But there are two time domain windows that need to be set for the channel estimation. The two time domain windows are centered around 0 and $\Delta l$, and their widths are determined empirically.

If the echo is classified as pre-echo, a new window placement is needed. This moves the channel with a smaller delay path to around zero and the channel with a longer path to be centered at $\Delta l$. The pre-echo and post-echo channels can be found for example in the single frequency network, where the pre-echo can be from a local transmitter station with a weak transmission power and remote transmitter stations with strong transmission power, and the post-echo can be from a local transmitter station with a strong transmission power and remote transmitter stations with weak transmission power.

For long echo, the edge filter does not work because the edge filter is designed for the normal fading channel. The maximum delay of the long echo is often greater than the normal fading channel. Therefore, the edge filter will not be used if the channel is detected to be long echo.

Figure 7:
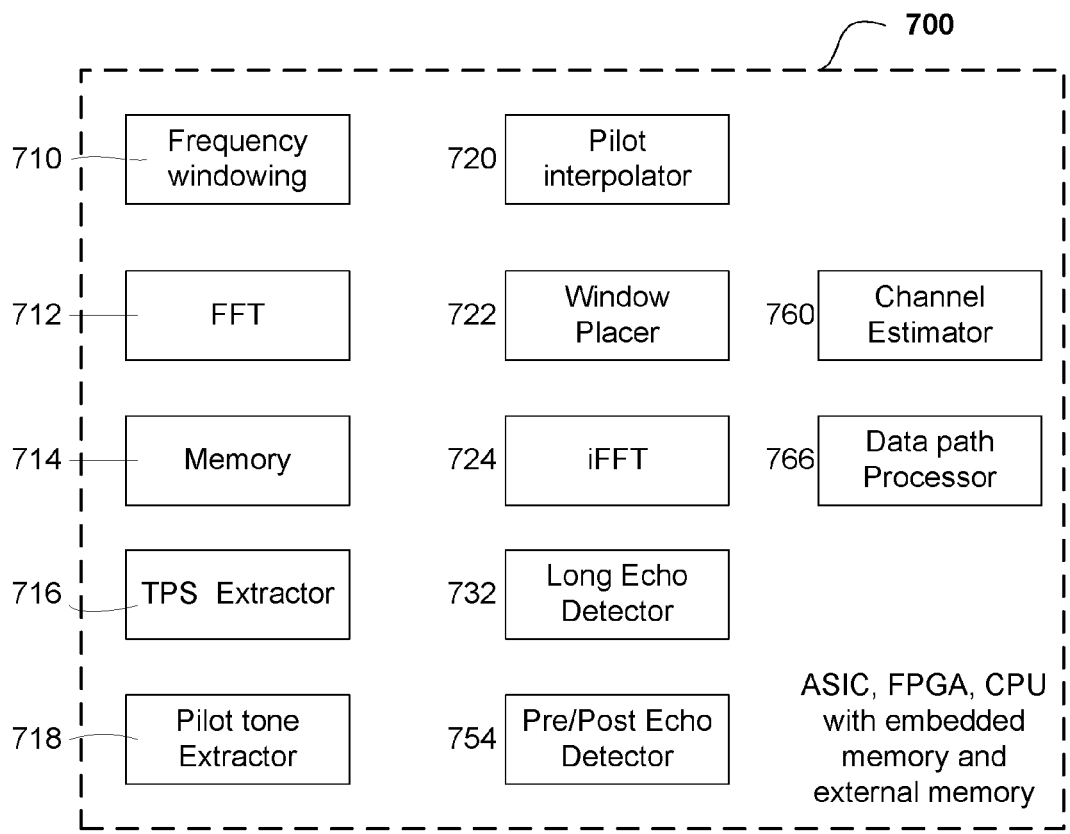
FIG. 7 is a block diagram of an OFDM receiver performing long echo detection and channel estimation in accordance with one embodiment of the present invention.

FIG. 7 shows a block diagram of an OFDM receiver 700 according to one embodiment of the present invention and adapted to perform long echo detection and channel estimation for OFDM transmission systems. The OFDM receiver system 700 is shown as including a frequency windowing block 710 which synchronizes the baseband signals at the output of the analog-to-digital converter (ADC) with the FFT block 712. Subcarriers including TPS carriers and pilot tones are stored in memory module 714. Memory module 714 can be internal or external to system 700 as TPS extractor 716 and pilot tone extractor 718 may collect the respective TPS information and pilot tones at the FFT 712 output. Pilot interpolator 720 performs any interpolation schemes including the ones describes in U.S. application Ser. No. 11/870,726. Window placer 722 places a time window, such as a rectangular shape, around the impulse response to capture the most impulse energy. Window placer 722 is used several times during the channel estimation process for obtaining maximum baseband signal energy. IFFT block 724 is used many times in receiver 700 to transform the interpolated pilot tones and data subcarriers to the time domain. In one embodiment of the present invention, IFFT 724 is part of FFT 712 as they both perform a similar function. Long echo detector 732 identifies a long echo by calculating the time difference between discrete time domain peaks above a predetermined power threshold. Based on the result of the long echo detection, an appropriate pilot interpolation scheme will be performed. For example, pilot interpolation shown in FIG. 2a is used for the long echo channel, whereas those shown in FIGS.

2b-2c are used for a short echo channel. IFFT 724 transforms the interpolated pilots to the time domain, where the long echo will be further classified by Pre/Post-echo identifier 354. A new time window will be optimally placed on the channel response in the case of the pre-echo to capture the time response energy as much as possible without inter-symbol interference. Block 760 performs an FFT of the channel response to obtain an accurate frequency-domain channel estimate. Data path processor 766 performs the OFDM demodulation functions such as TPS decoding, signal demodulation, de-interleaving, decoding and error correction. The blocks shown in FIG. 7 may be implemented by an FPGA, an ASIC, or dedicated hardware. In other embodiments, the function of the logic blocks shown in FIG. 7 may be implemented in software executed by a CPU. In other embodiment, a combination of hardware and software may be used to implement these functions.

One advantageous embodiment of the present invention is that, based on an estimate of the channel impulse response on an interpolated set of pilot tones, an OFDM demodulator is able to accurately estimate the channel impulse response even in the presence of noise and even when the channel length is longer than the guard interval.

The above embodiments of the present invention are illustrative and not limiting. Various alternatives and equivalents are possible. The invention is not limited by the type of integrated circuit in which the present invention may be disposed. Nor is the invention limited to any specific type of process technology, e.g., CMOS, Bipolar, or BICMOS that may be used to manufacture the present invention. Other additions, subtractions or modifications are obvious in view of the present disclosure and are intended to fall within the scope of the appended claims.

What is claimed is:

1. A method for detecting long echo in an OFDM receiving system, the method comprising:
   receiving a sequence of OFDM symbols, each OFDM symbol including data subcarriers and pilot tones;
   increasing a number of pilot tones in at least one of the OFDM symbols;
   obtaining a power amplitude of at least one subcarrier of the at least one of the OFDM symbols by multiplying the at least one subcarrier by its complex conjugate;
   generating time-domain samples associated with the power amplitude of the at least one subcarrier;
   detecting a time difference between at least two peaks associated with the time domain samples;
   estimating a channel through which the OFDM symbol is received in accordance with a first pilot interpolation algorithm if the detected time difference is smaller than or equal to a predefined value; and
   estimating the channel in accordance with a second pilot interpolation algorithm if the detected time difference is greater than the predefined value
   wherein the second pilot interpolation algorithm comprises:
      obtaining a pilot tone at a position i+3 of a current OFDM symbol by taking a weighted average of a pilot tone at the position i+3 of a succeeding OFDM symbol and a pilot tone at the position i+3 of a third preceding OFDM symbol, i being a position index of a pilot tone at a position i of the current OFDM symbol;
      obtaining a pilot tone at a position i+6 of the current OFDM symbol by taking a weighted average of a pilot tone at the position i+6 of a second succeeding OFDM symbol and a pilot tone at the position i+6 of a second preceding OFDM symbol; and
      obtaining a pilot tone at a position i+9 of the current OFDM symbol by taking a weighted average of a pilot tone at the position i+9 of a third succeeding OFDM symbol and a pilot tone at the position i+9 of a preceding OFDM symbol.

2. The method of claim 1 further comprising, prior to generating the time-domain samples:
   padding the power amplitude of the at least one of the OFDM symbols having Np subcarriers with zero-valued samples;
   converting the zero-padded power spectrum to the time domain samples to obtain Np power taps;
   wherein detecting the time difference comprises:
   determining from among the Np power taps a first power tap defining a first one of the at least two peaks; and
   determining from among the Np power taps a second power tap defining a second one of the at least two peaks.

3. The method of claim 2 further comprising:
   performing an IFFT operation to convert the zero-padded power spectrum to the time domain.

4. The method of claim 1 wherein the first pilot interpolation algorithm comprises at least:
   obtaining a pilot tone at the position i+3 of the current OFDM symbol by taking a weighted average of the pilot tone at the position i+3 of the succeeding OFDM symbol and a pilot tone at the position i+3 of the preceding OFDM symbol, which is an average of a pilot tone at the position i+6 of second preceding OFDM symbol and the pilot tone at the position i of the current OFDM symbol.

5. An OFDM receiver comprising logic blocks adapted to:
   receive a sequence of OFDM symbols, each OFDM symbol including data subcarriers and pilot tones;
   increase a number of pilot tones in at least one of the OFDM symbols;
   obtain a power amplitude of at least one subcarrier of the at least one of the OFDM symbols by multiplying the at least one subcarrier by its complex conjugate;
   generate time-domain samples associated with the power amplitude of the at least one subcarrier;
   detect a time difference between at least two peaks associated with the time domain samples;
   estimate a channel through which the OFDM symbol is received in accordance with a first pilot interpolation algorithm if the detected time difference is smaller than or equal to a predefined value; and
   estimate the channel in accordance with a second pilot interpolation algorithm if the detected time difference is greater than the predefined value,
   wherein the second pilot interpolation algorithm is configured to:
      obtain a pilot tone at a position i+3 of a current OFDM symbol by taking a weighted average of a pilot tone at the position i+3 of a succeeding OFDM symbol and a pilot tone at the position i+3 of a third preceding OFDM symbol, i being a position index of a pilot tone at a position i of the current OFDM symbol;
      obtain a pilot tone at a position i+6 of the current OFDM symbol by taking a weighted average of a pilot tone at the position i+6 of a second succeeding OFDM symbol and a pilot tone at the position i+6 of a second preceding OFDM symbol; and
      obtain a pilot tone at a position i+9 of the current OFDM symbol by taking a weighted average of a pilot tone at the position i+9 of a third succeeding OFDM symbol and a pilot tone at the position i+9 of a preceding OFDM symbol.

6. The OFDM receiver of claim 5 wherein the logic blocks are further adapted to:
pad the power amplitude of the at least one of the OFDM symbols having Np subcarriers with zero-valued samples;
convert the zero-padded power spectrum to the time domain samples to obtain Np power taps;
determine from among the Np power taps a first power tap defining a first one of the at least two peaks; and
determine from among the Np power taps a second power tap defining a second one of the at least two peaks.

7. The OFDM receiver of claim 5 wherein the OFDM receiver comprises an IFFT module.

* * * * *